May 13, 1930.  G. S. BUTENKOFF  1,758,274
TORSIONAL VIBRATION ELIMINATOR
Filed July 20, 1927
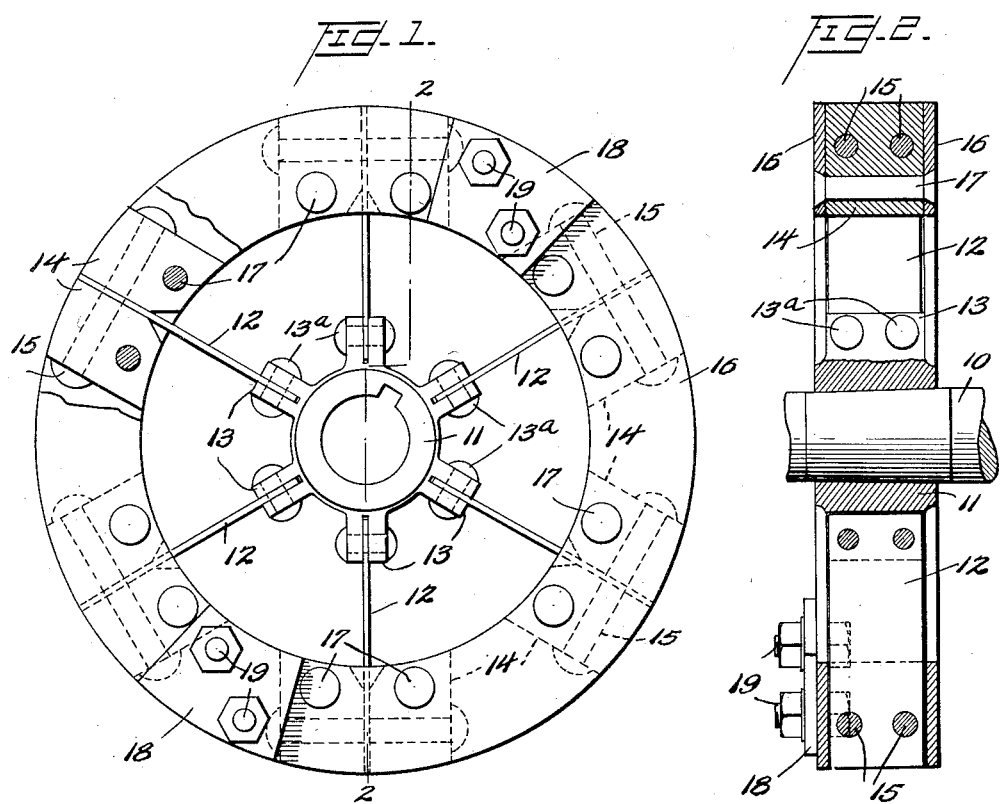
Inventor
G. S. Butenkoff
By Watson, Cock, Moss & Grindle
Attorney Patented May 13, 1930

1,758,274

UNITED STATES PATENT OFFICE

GEORGE S. BUTENKOFF, OF DETROIT, MICHIGAN

TORSIONAL-VIBRATION ELIMINATOR

Application filed July 20, 1927. Serial No. 207,230.

This invention relates to an arrangement for eliminating or damping torsional vibration in a rotating shaft and particularly the crank shaft of internal combustion engines. Such vibration, as is well known, leads to irregular running of the engine and not infrequently results in fracture of the shaft itself. The object of this invention is to provide a device for the purpose indicated which is simple, and inexpensive in construction, which can be easily applied to a shaft, and which includes generally a weighted body spaced from and connected to the shaft by means of flexible spokes and rotatable with the shaft. The weighted body is preferably in the form of a weighted ring, but may be made in other forms.

The invention in one specific embodiment is illustrated in the accompanying drawings forming a part hereof, it being understood that the drawing is illustrative only and that various modifications of the construction may be resorted to if desired.

In said drawings:

Figure 1 is a side view of my improved device, parts being cut away; and

Figure 2 is a section substantially on line 2—2 of Figure 1.

The particular arrangement illustrated includes a shaft 10 in which it is desired to dampen or eliminate torsional vibration. Surrounding the shaft 10 is a hub 11 keyed or otherwise secured to the shaft to rotate therewith. Rigidly secured to the hub 11 and extending radially of the shaft 10 are a plurality of flexible spokes 12, the number of which may be varied as desired. The spokes are inserted in slots formed in lugs 13 of the hub and secured therein by rivets 13ª, although bolts may be employed for this purpose as an obvious equivalent without departing from the spirit of my invention. Preferably the spokes are formed of strips of flat flexible metal. The foregoing provides a simple means for rigidly securing the inner ends of the spokes to the shaft 10, but any other means desired may, of course, be employed.

At its outer end, each spoke 12 is provided with a weight which is preferably accomplished by securing a weighted member 14 to each face of the spoke adjacent its outer end. Each pair of weights 14 and the intermediate spoke are held together by means of rivets 15, although bolts may be employed for this purpose as an obvious equivalent without departing from the spirit of my invention. Preferably the various weights 14 are secured together by means of two annular plates 16, one on either side thereof, and bolts or rivets 17 pass through the weights 14 and plates 16. By this means the weights 14 and plates 16 are combined to form a rigid ring which surrounds and is spaced from the shaft 10, the only connection between the two being the flexible spokes 12.

In some cases it may be desirable to have the annular plates split or cut transversely so that the weights at the ends of the spokes are divided into groups, each movable relative to the other. Thus the plates may be cut so that each two adjacent spokes will support a group of weights. In some cases it may be found desirable to make the weight at the end of each spoke separate and independent of the other weights. But, as noted, it will generally be found preferable to combine the various weights in a rigid ring.

In order to balance the system and increase the weight of the ring, it may be desirable to add additional or supplemental weights thereto. For this purpose weights 18 are shown as applied to the side of the plates 16 being secured thereto by bolts 19 which pass through the plates 16 between the weights 14. In the drawing, only one set of weights 18 are shown, arranged on opposite sides of the shaft 10.

With a system of this kind when the shaft 10 starts to develop torsional vibrations, the weighted ring with its flexible connection to the shaft tends to oppose or dampen such vibrations and in this way the torsional vibrations of the shaft will be checked.

Having thus described the invention, what is claimed as new and desired to be secured by Letters Patent is:

1. A device of the character described, comprising in combination, a rotatable shaft which is subject to torsional vibration, a weighted ring surrounding said shaft and spaced therefrom, a hub secured to said shaft for rotation therewith, and a plurality of circumferentially flexible spokes rigidly connected to said ring and to said hub, whereby the torsional vibration of said shaft is damped by said weighted ring and flexible spokes.

2. A device of the character described, comprising in combination, a rotatable shaft which is subject to torsional vibration, a ring surrounding and spaced from said shaft, a plurality of weights connected by said ring, a plurality of flexible spokes rigidly secured to said shaft and extending radially therefrom, the outer ends of the spokes being rigidly secured to said ring, whereby the torsional vibration of said shaft is damped by said weights and spokes.

3. A device of the character described, comprising in combination, a rotatable shaft which is subject to torsional vibration, a plurality of weights surrounding said shaft and spaced therefrom, a hub secured to said shaft for rotation therewith, a plurality of circumferentially flexible spokes extending outwardly from said shaft and having their inner ends rigidly secured to said hub and their outer ends rigidly secured respectively to said weights, whereby the torsional vibration of said shaft is damped by said weights and flexible spokes.

4. A device of the character described comprising in combination, a rotatable shaft which is subject to torsional vibration, a plurality of weights surrounding said shaft and spaced therefrom, a member to which the weights are secured to hold them in spaced relation with respect to each other and a plurality of flat flexible spokes of uniform cross section secured to and extending radially of said shaft and secured to said member, whereby torsional vibration of said shaft is damped by said weights and spokes.

5. Means for damping vibrations in a rotating shaft and the like comprising, in combination, a plurality of flexible spokes rigidly secured at their inner ends to said shaft and extending radially outwardly therefrom, and weights secured to the outer ends of said spokes, and plates connecting said weights to form a ring around said shaft.

6. Means for damping vibrations in a rotating shaft and the like comprising, in combination, a plurality of flexible spokes rigidly secured at their inner ends to said shaft and extending radially outwardly therefrom, and weights secured to the outer ends of said spokes, and annular plates connecting said weights to form a continuous ring around said shaft.

7. A device for damping vibrations in rotating shafts and the like comprising, in combination, two annular plates surrounding said shaft, a plurality of weights arranged between and secured to said plates, a hub secured to said shaft, and a plurality of flexible spokes extending radially of said shaft and secured at their outer ends between said plates and at their inner ends to said hub.

In testimony whereof I hereunto affix my signature.

GEORGE S. BUTENKOFF.